United States Patent
Berruet et al.

(10) Patent No.: US 9,726,270 B2
(45) Date of Patent: Aug. 8, 2017

(54) CAM FOLLOWER ROLLER DEVICE, NOTABLY FOR A FUEL INJECTION PUMP

(71) Applicants: Nicolas Berruet, Artannes sur Indre (FR); François Champalou, Chaumont-sur-Loire (FR); Benoît Hauvespre, Saint Etienne de Chigny (FR); Samuel Viault, Saint-Antoine-du-Rocher (FR)

(72) Inventors: Nicolas Berruet, Artannes sur Indre (FR); François Champalou, Chaumont-sur-Loire (FR); Benoît Hauvespre, Saint Etienne de Chigny (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/690,890

(22) Filed: Apr. 20, 2015

(65) Prior Publication Data
US 2015/0300476 A1  Oct. 22, 2015

(30) Foreign Application Priority Data

Apr. 22, 2014 (EP) ..................................... 14165445

(51) Int. Cl.
*F16H 53/06* (2006.01)
*F04B 1/04* (2006.01)

(52) U.S. Cl.
CPC ........... *F16H 53/06* (2013.01); *F04B 1/0408* (2013.01); *F04B 1/0413* (2013.01); *F04B 1/0426* (2013.01)

(58) Field of Classification Search
CPC ...... F16H 53/06; F04B 1/0413; F04B 1/0408; F04B 1/0426; F02M 39/02; F01L 1/143; F01L 1/22; F01L 1/14; Y10T 74/2107
See application file for complete search history.

(56) References Cited

U.S. PATENT DOCUMENTS 2,152,403 A * 3/1939 Dostal ...................... F01L 1/14
                                                                 123/90.51
2,152,404 A * 3/1939 Dostal ...................... F01L 1/14
                                                                 123/90.51

(Continued)

FOREIGN PATENT DOCUMENTS

DE   WO 2006108483 A1 * 10/2006 ............... F01L 1/143
DE       102006031032 A1 *  1/2008 ............... F01L 1/143

(Continued)

OTHER PUBLICATIONS

Machine translation of WO 2012/080330 A1 obtained on May 13, 2016.*

*Primary Examiner* — Adam D Rogers
(74) *Attorney, Agent, or Firm* — Bryan Peckjian; SKF USA Inc. Patent Dept.

(57) ABSTRACT

A cam follower roller device, notably for fuel injection pump of an internal combustion engine, the cam follower roller device comprising a casing, a shaft mounted on the casing and a roller rotatably mounted on the shaft. The casing comprises on its periphery at least four openings made through the thickness of the casing and located in such a way that two openings face one end of the outer cylindrical surface of the roller.

8 Claims, 6 Drawing Sheets

(56) References Cited

U.S. PATENT DOCUMENTS

| | | | | |
|---|---|---|---|---|
| 5,127,374 | A * | 7/1992 | Morel, Jr. | F01L 1/14 123/90.35 |
| 5,188,068 | A * | 2/1993 | Gaterman, III | F01L 1/14 123/90.35 |
| 7,785,086 | B2 * | 8/2010 | Dinkel | B60T 8/4031 137/454.4 |
| 8,104,442 | B2 * | 1/2012 | Dorn | F01L 1/143 123/90.48 |
| 8,474,427 | B2 * | 7/2013 | Dorn | F01L 1/14 123/90.48 |
| 8,616,772 | B1 * | 12/2013 | Kellar | F16C 17/18 384/10 |
| 9,074,474 | B2 * | 7/2015 | Maier | F02M 59/102 |
| 2008/0190237 | A1 * | 8/2008 | Radinger | F01L 1/143 74/569 |
| 2010/0324690 | A1 | 12/2010 | Cannon et al. | |
| 2015/0337939 | A1 * | 11/2015 | Van Der Mei | F02M 59/102 74/569 |
| 2016/0091073 | A1 * | 3/2016 | Berruet | F16H 53/06 74/559 |
| 2016/0153321 | A1 * | 6/2016 | Berruet | F02M 59/102 123/90.44 |
| 2016/0153322 | A1 * | 6/2016 | Berruet | F02M 59/102 74/559 |
| 2016/0230868 | A1 * | 8/2016 | Champalou | F02M 59/102 |

FOREIGN PATENT DOCUMENTS

| | | | | |
|---|---|---|---|---|
| DE | WO 2012080330 | A1 * | 6/2012 | F02M 59/102 |
| DE | 102012208791 | A1 | 11/2013 | |
| WO | 0181727 | A1 | 11/2001 | |

* cited by examiner

CAM FOLLOWER ROLLER DEVICE, NOTABLY FOR A FUEL INJECTION PUMP

CROSS REFERENCE TO RELATED APPLICATIONS

This is a Non-Provisional Patent Application, filed under the Paris Convention, claims the benefit of European Patent (EP) Application Number 14165445.9 filed on 22 Apr. 2014 (22 Apr. 2014), which is incorporated herein by reference in its entirety.

FIELD OF THE INVENTION

The present invention relates to the field of mechanical cam follower roller devices for actuating a reciprocating movement used in automotive or industrial applications.

PRIOR ART

An advantageous application of the invention is the use of the cam follower roller device in a fuel injection pump intended for an internal combustion engine, notably of a motor vehicle.

Such a cam follower roller device generally comprises an outer sleeve or casing and a roller mounted on the casing and adapted to collaborate with a cam synchronized with the internal combustion engine camshaft so that the rotation of the camshaft leads to a periodic displacement of a piston of the pump which is in contact against the casing of the device. Patent application US2008/0190237 discloses such a conventional mechanical cam follower roller device.

With increasing demand on fuel efficiency, the pressure of the fuel pump has raised significantly last years. With a higher fuel pump pressure, the load applied on the cam follower device increases as well as the pressure contact between the roller and the cam.

Otherwise, automotive engine manufactures are looking for an oil-free operation. This means that the use of the lubricating oil shall be limited or even avoided for the cam follower device. Besides, some time is necessary for the engine oil to reach the tappet. Accordingly, there will be a period of time without lubrication for the tappet.

Currently, the conventional mechanical cam follower roller devices are not adapted to meet these two major requirements: a higher contact pressure and an increased service life.

OBJECT AND BRIEF SUMMARY OF THE INVENTION

One aim of the present invention is to overcome these drawbacks.

It is a particular object of the present invention to provide a cam follower roller device, notably for a fuel injection pump, which has an increased service life.

In one embodiment, the cam follower roller device, notably for fuel injection pump of an internal combustion engine, comprises a casing, a shaft mounted on the casing and a roller rotatably mounted on the shaft. The casing comprises on its periphery at least four openings made through the thickness of the casing and located in such a way that two openings face one end of the outer cylindrical surface of the roller.

The openings provided in the casing allow the insertion of a roller of larger diameter and of larger axial length. The contact pressure between the roller and the cam can thus be reduced thanks to the increase of the contact surface of the roller and the service life is thus increased. Furthermore, the openings allow a weight reduction. The outer diameter of the tappet casing is a standard dimension, such that openings in the tappet casing allow the use of a bigger roller without modifying the overall dimensions of the tappet casing.

Advantageously, the outer casing comprises a first end and a second end opposite to the first end, the second end comprises an outwardly opened recess inside which the roller is mounted and through-holes supporting the ends of the shaft.

The roller may comprises an outer cylindrical surface forming the rolling surface delimited radially by two lateral surfaces axially into contact with flat sections formed on the inner surface of the second end of the casing, in the region of the trough-holes.

The openings may be each located at one end of the flat sections.

In one embodiment, the openings have the shape of an outwardly opened slot.

In another embodiment, the openings have the shape of through-holes.

Advantageously, the roller radially projects from the outer surface of the second end of the casing.

In one embodiment, at least one of the shaft and the roller is coated with an antifriction and/or wear resistance coating.

In one embodiment, the cam follower roller device further comprising a bushing radially interposed between the roller and the shaft.

In one embodiment, the outer surface of the bushing in contact with the bore of the roller and the bore of the bushing in contact with the outer cylindrical surface of the shaft are each coated with an antifriction and/or wear resistance coating.

BRIEF DESCRIPTION OF THE DRAWINGS

The present invention and its advantages will be better understood by studying the detailed description of specific embodiments given by way of non-limiting examples and illustrated by the appended drawings on which

DETAILED DESCRIPTION OF PARTICULAR EMBODIMENTS

A first embodiment of a mechanical cam follower roller device 10 is illustrated on FIGS. 1 to 4; the device may for example be used in a fuel injection pump intended for an internal combustion engine. The device 10 may be used in other applications, for example in a rocker system adapted to control the valves of an internal combustion engine.

The device 10 comprises an outer casing or tappet body 12, a pin or shaft 14 extending along an axis X-X and mounted on the casing, and a roller 16 supported on the shaft 14 and adapted to press against a cam (not shown) synchronized with the internal combustion engine camshaft or directly against a cam of the camshaft.

The outer casing 12 has a tubular form and may be made of stamped metal sheet. The outer casing 12 comprises a first end 18 and a second end 20 opposite to the first end 18.

The first end 18 comprises an outwardly opened recess 18a designed to cooperate with a pump piston (not shown) delimited by a two lateral walls 18b and a flat seat 18c forming a stroke-transmission plate for the piston head (not shown). The second end 20 comprises an outwardly opened recess 20a inside which the roller 16 is mounted.

Figure 3:
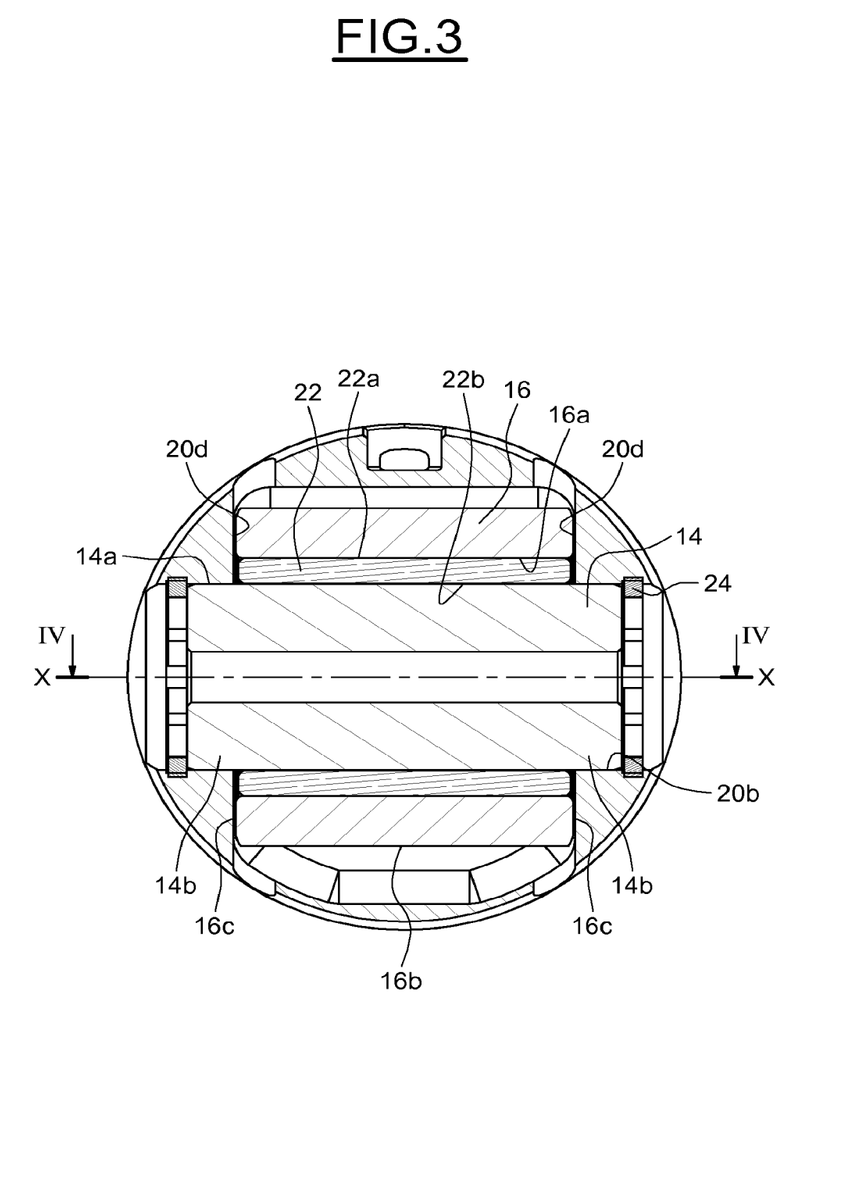
FIG. 3 is a cross-section along line of FIG. 2.
Figure 4:
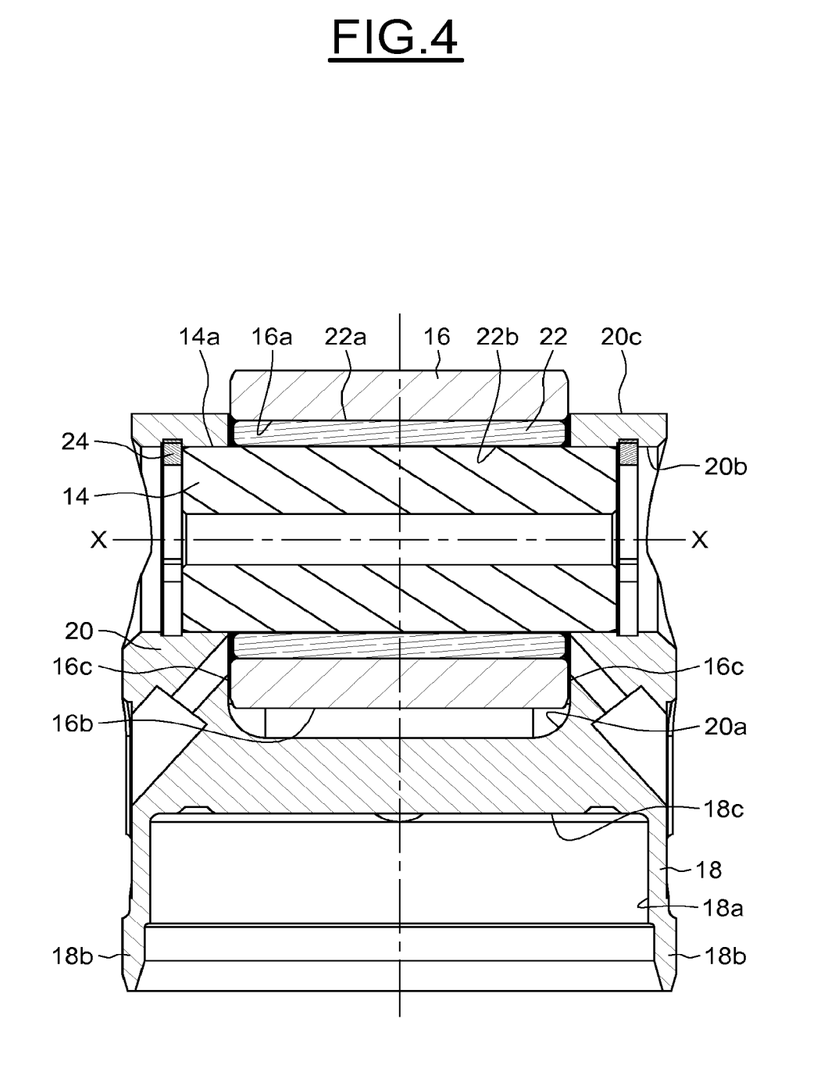
FIG. 4 is a cross-section along line IV-IV of FIG. 3.

The roller 16 has a bore 16a of cylindrical shape rotatably mounted on an outer cylindrical surface 14b of the shaft 14. As illustrated, the device 10 further comprises a sleeve or bushing 22 radially disposed between the outer surface 14b of the pin 14 and the bore 16a of the roller 16. An outer cylindrical surface 22a of the bushing 22 comes radially into contact with the bore 16a of the roller and an inner bore 22b of the bushing 22 comes radially into contact with the outer surface 14b of the shaft. Advantageously, the bushing 22 is coated with at least an antifriction and/or wear resistance coating. The bushing 22 may be coated with a diamond like carbon coating or a black oxide coating as previously described. Preferably, the outer surface 22a of the bushing 22 is coated with the diamond like carbon coating when the black oxide coating is provided on the bore 16a of the roller 16, and the bore 22b of the bushing is coated with the black oxide coating when the diamond like carbon coating is provided on the outer surface 14b of the shaft 14. Alternatively, the device may not comprise a bushing in such a way that the bore 16a of the roller 16 is radially in direct contact with the outer surface 14a of the shaft 14.

As illustrated, the ends 14c of the shaft 14 project out of the roller 16 and are supported in through-holes 20b formed on the second end 20 of the casing 12 and facing on another. The shaft 14 is axially maintained in the through-holes 20b by means of a washer 24 radially mounted inside each through-hole 20b. Alternatively, the shaft 14 may be fixed to the casing by push-fitting in the through-holes 20b. Alternatively, the shaft 14 may be fixed to the casing 12 by any other appropriate means.

The roller 16 radially projects from the outer surfaces 20c of the second end 20 of the casing 12. The four outer surfaces 20c (illustrated in FIG. 1) together form an outer end of the casing 12. The roller 16 comprises an outer cylindrical surface 16b forming the rolling surface delimited by two parallel lateral radial surfaces 16c perpendicular to the roller rotational.

The lateral surfaces 16c of the roller come axially into contact with flat sections 20d formed on the inner surface of the second end 20 of the casing 12, in the region of the trough-holes 20b.

Figure 1:
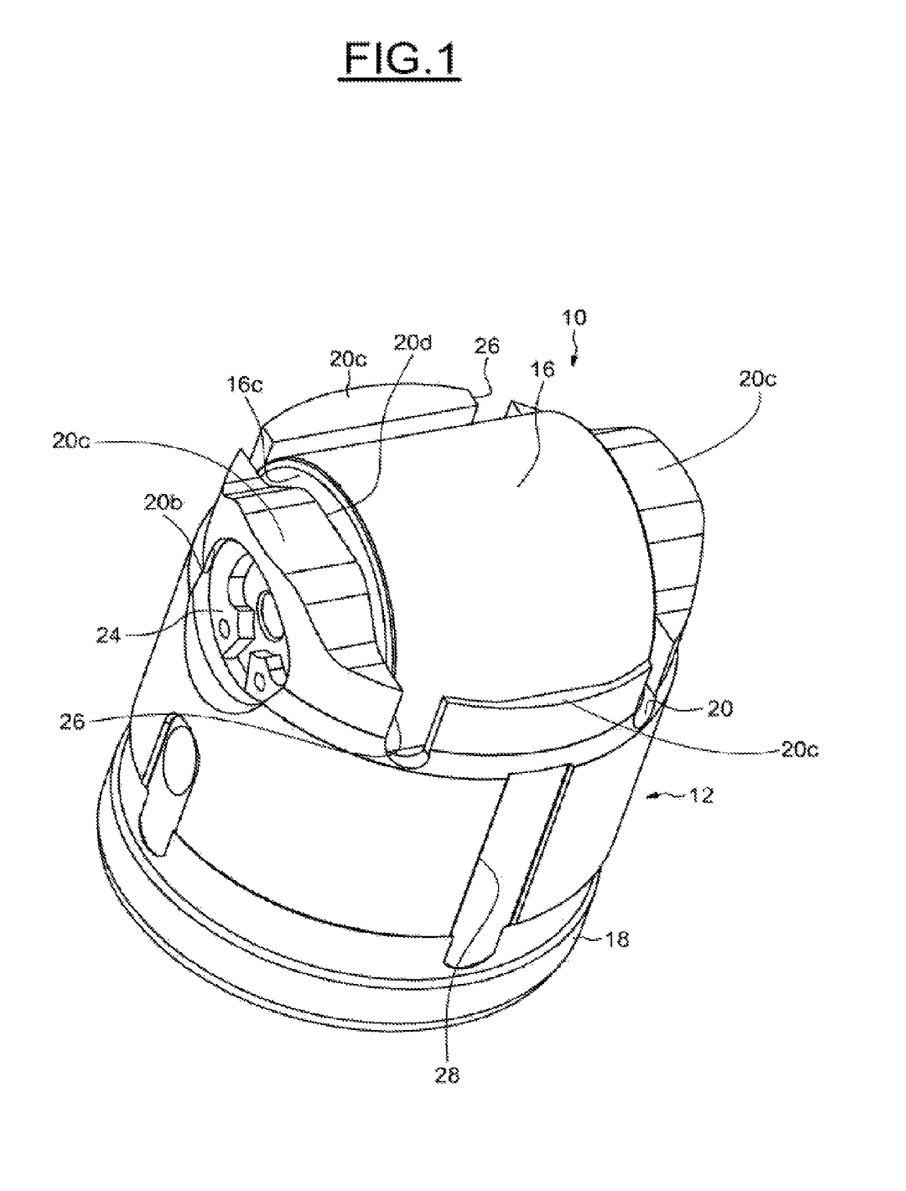
FIG. 1 is a perspective view of a cam follower roller device according to first embodiment of the invention.
Figure 2:
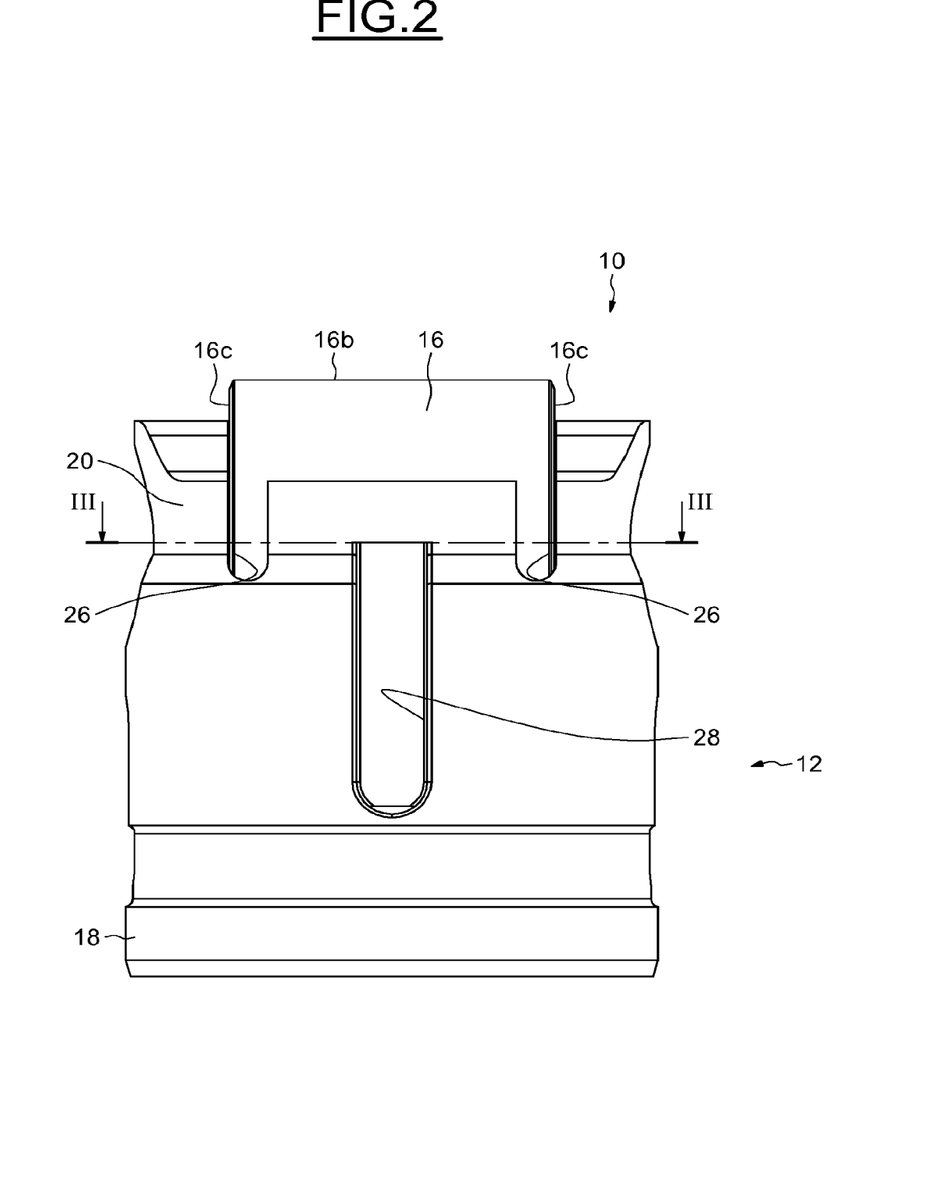
FIG. 2 is a side view of the cam follower roller device of FIG. 1.

On the periphery of the second end 20 of the casing 12, four openings 26 can be seen, which allow the insertion of a roller 16 of bigger dimensions inside the casing 12.

As illustrated on FIGS. 1 to 4, the openings 26 are each located at one end of the flat sections 20d in such a way that two openings face one end 16c of the outer cylindrical surface 16b of the roller 16. The openings are disposed in such a way to be symmetrical compared to the rotational axis X-X and compared to a radial axis (not shown) perpendicular to the rotational axis X-X. Each opening 26 is made through the thickness of the casing 12 and has the shape of an outwardly opened slot.

The casing 12 further comprises on its outer cylindrical surface, a groove 28 designed as a path for the lubricating oil of the engine to reach the roller 16, the shaft 14 and the bushing 22 if there is a bushing.

Figure 5:
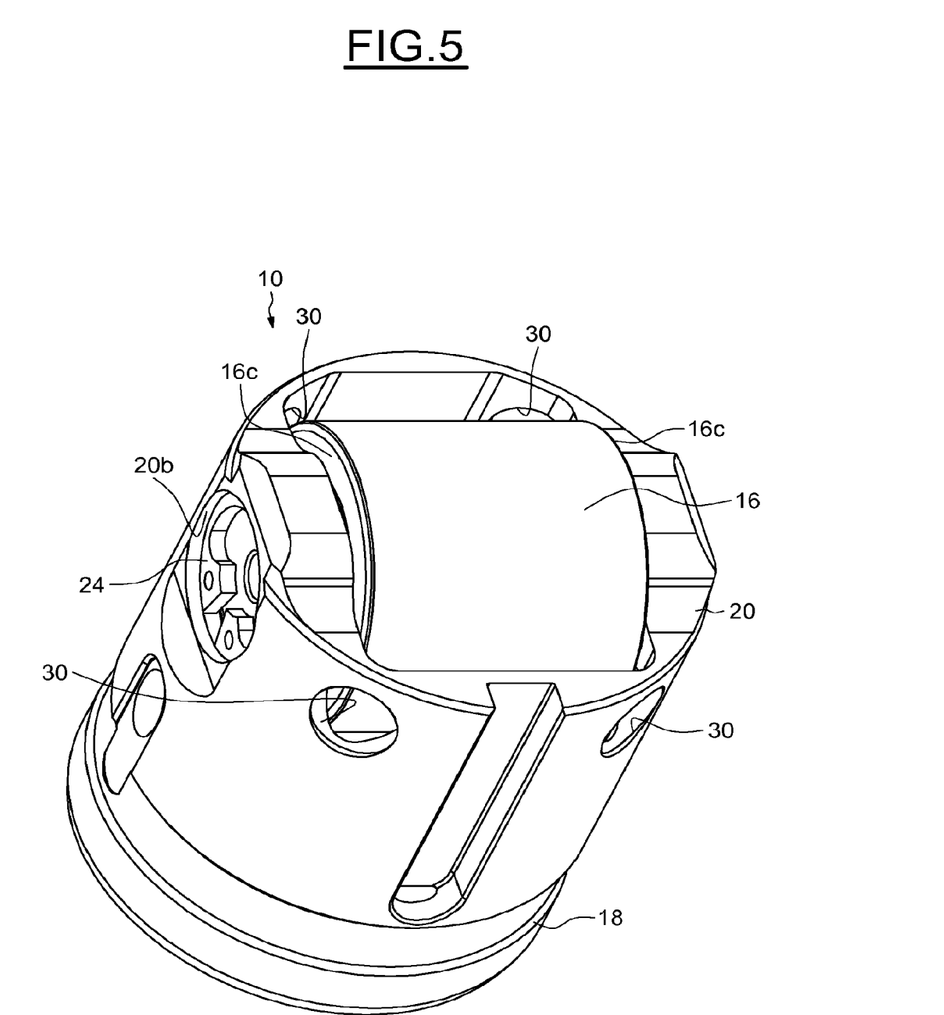
FIG. 5 is a perspective view of a cam follower roller device according to second embodiment of the invention.
Figure 6:
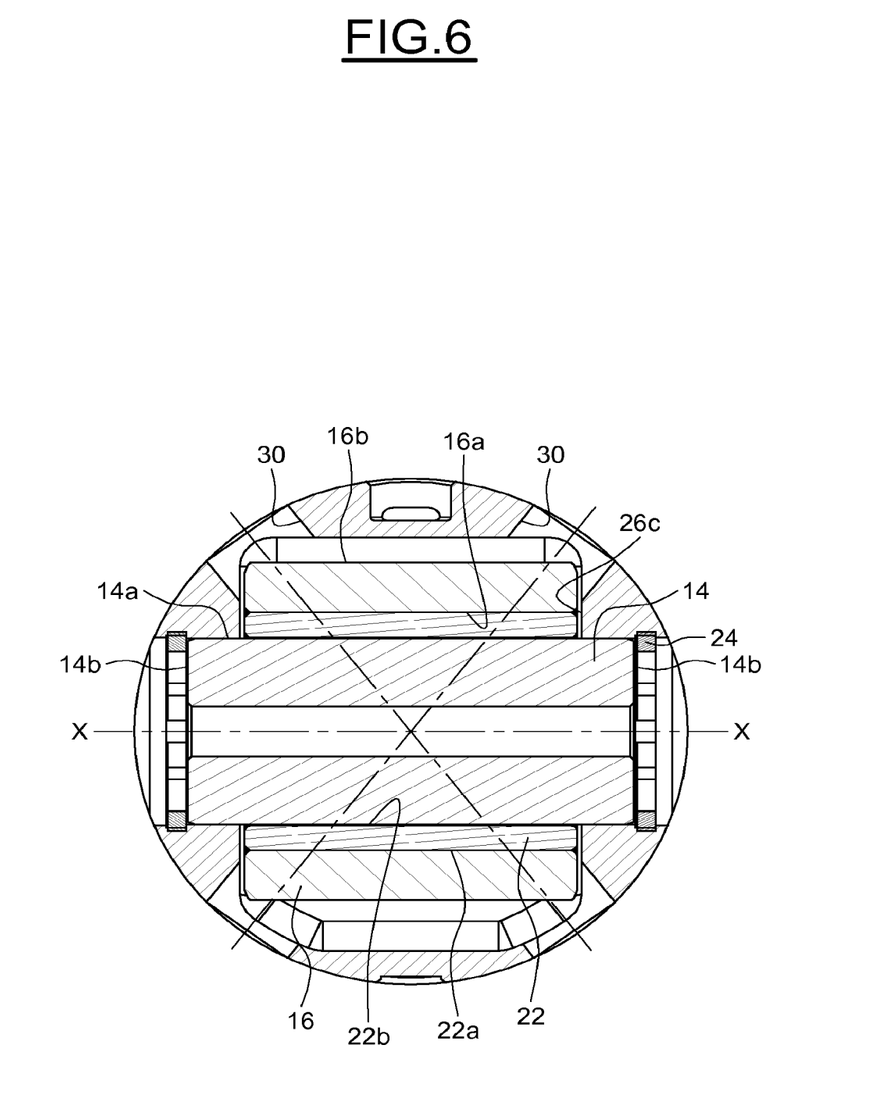
FIG. 6 is a cross-section of the cam follower roller device of FIG. 5.

The embodiment shown on FIGS. 5 and 6, in which identical parts are given identical references, differs from the previous embodiment in that the four openings 30 provided on the periphery of the second end 20 of the casing 12 have the shape of though-holes.

Thanks to the openings provided at each end of the roller, a roller of bigger dimensions (diameter and axial length) can be inserted inside the casing without increasing the diameter of the casing. The openings provided in the casing allow the insertion of a roller of larger diameter and of larger axial length. Thanks to the increase in the contact surface of the roller, the contact pressure between the roller and the cam can thus be reduced.

The service life of the cam follower roller device is enhanced even under highly loaded conditions. The cam follower roller device according to the invention can be used with a camshaft, a crankshaft or a balancing shaft.

The invention claimed is:

1. A cam follower roller device for a fuel injection pump of an internal combustion engine, the cam follower roller device comprising:
 a casing being generally tubular in shape that extends along a casing axial direction and having an outer end at an axial end of the casing that is generally circular, the outer end of the casing comprising of a first surface, a second surface, a third surface, and a fourth surface,
 a shaft mounted on the casing; and
 a roller rotatably mounted on the shaft and comprising an outer cylindrical surface delimited by first and second lateral surfaces and also comprising a rotational axis, the outer cylindrical surface extending outwardly past the outer end of the casing,
 the first and second surfaces of the outer end having respective first and second inner peripheries that face the outer cylindrical surface of the roller, the third and fourth surfaces having respective third and fourth inner peripheries that face the first and second lateral surfaces of the roller, respectively, wherein first and second circumferential ends of each of the third and fourth surfaces have an axial location equal to an axial direction of the first and second surfaces, and wherein each of the third and fourth surfaces have a middle portion that extends axially outwardly from the axial location with respect to the casing axial direction,
 wherein the third and fourth inner peripheries extend linearly in a direction perpendicular to the rotational axis of the roller, and wherein the first inner periphery extends linearly in a second direction parallel to the rotational axis of the roller,
 the casing including at least four openings extending inwardly from the outer end of the casing and made through the thickness of the casing and located in such a way that two openings of the at least four openings face one end of the outer cylindrical surface of the roller, the at least four openings separating each of the first, second, third, and fourth surfaces from each other such that each of the first, second, third, and fourth surfaces are circumferentially delimited by two of the at least four openings, wherein the third inner periphery extends linearly in the direction perpendicular to the rotational axis of the roller from a first circumferential end of a first of the at least four openings to a second circumferential end of a second of the at least four openings, and wherein the fourth inner periphery extends linearly in the direction perpendicular to the rotational axis of the roller from a third circumferential end of a third of the at least four openings to a fourth circumferential end of a fourth of the at least four openings.

2. The cam follower roller device according to claim 1, the casing further comprising through-holes configured to support ends of the shaft.

3. The cam follower roller device according to claim 2, wherein the first and second lateral surfaces are configured to contact the third and fourth inner peripheries, respectively, of the casing, in a region of the through-holes.

4. The cam follower roller device according to claim 3, wherein the at least four openings are each located at one end of the flat sections.

5. The cam follower roller device according to claim 1, wherein the at least four openings have the shape of an outwardly opened slot.

6. The cam follower roller device according to claim 1, wherein at least one of the shaft and the roller is coated with at least one of an antifriction and a wear resistance coating.

7. The cam follower roller device according to claim 1, further comprising a bushing radially interposed between the roller and the shaft.

8. The cam follower roller device according to claim 7, wherein an outer surface of the bushing is in contact with a bore of the roller and a bore of the bushing is in contact with an outer cylindrical surface of the shaft, and wherein the outer surface of the bushing and the outer cylindrical surface of the shaft are each coated with at least one of an antifriction and a wear resistance coating.

* * * * *